(12) United States Patent
Jain et al.

(10) Patent No.: US 11,847,028 B2
(45) Date of Patent: Dec. 19, 2023

(54) EFFICIENT EXPORT OF SNAPSHOT CHANGES IN A STORAGE SYSTEM

(71) Applicant: VMware, Inc., Palo Alto, CA (US)

(72) Inventors: Abhay Kumar Jain, Cupertino, CA (US); Wenguang Wang, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 339 days.

(21) Appl. No.: 16/920,490

(22) Filed: Jul. 3, 2020

(65) Prior Publication Data

US 2022/0004461 A1    Jan. 6, 2022

(51) Int. Cl.
| | |
|---|---|
| G06F 16/00 | (2019.01) |
| G06F 11/14 | (2006.01) |
| G06F 16/16 | (2019.01) |
| G06F 16/18 | (2019.01) |
| G06F 16/174 | (2019.01) |
| G06F 16/11 | (2019.01) |

(52) U.S. Cl.
CPC ...... *G06F 11/1451* (2013.01); *G06F 11/1461* (2013.01); *G06F 11/1464* (2013.01); *G06F 11/1469* (2013.01); *G06F 16/128* (2019.01); *G06F 16/162* (2019.01); *G06F 16/1748* (2019.01); *G06F 16/1873* (2019.01); *G06F 2201/80* (2013.01)

(58) Field of Classification Search
CPC ............... G06F 11/1451; G06F 16/162; G06F 16/1873; G06F 16/1748; G06F 16/128; G06F 11/1461; G06F 11/1464; G06F 11/1469; G06F 2201/80

USPC ......................................................... 707/649
See application file for complete search history.

(56) References Cited

U.S. PATENT DOCUMENTS

| | | | |
|---|---|---|---|
| 10,025,806 B2 * | 7/2018 | Lu ........................... | G06F 3/061 |
| 10,515,192 B2 * | 12/2019 | Wang .................... | G06F 16/183 |
| 2008/0235445 A1 | 9/2008 | Kacin et al. | |
| 2011/0099342 A1 * | 4/2011 | Ozdemir ............. | G06F 11/2074 |
| | | | 711/E12.002 |
| 2012/0130949 A1 | 5/2012 | Picken et al. | |
| 2013/0262805 A1 | 10/2013 | Zheng et al. | |

(Continued)

OTHER PUBLICATIONS

T. Haynes, "Network File System (NFS) Version 4 Minor Version 2 Protocol", Internet Engineering Task Force (IETF), 104 pages, Nov. 2016.

(Continued)

*Primary Examiner* — Monica M Pyo

(57) ABSTRACT

Techniques for efficiently exporting snapshot changes are provided. In some embodiments, a system may receive a first snapshot of a data set in a storage system and a second snapshot the data set in the storage system. The system may further generate actions based on differences between the first snapshot and the second snapshot to produce a list of actions, wherein a modification to a file or directory path having a first directory location includes a first action to rename a file from the first directory location to a temporary storage location and a second action to rename the file from the temporary storage location to a second directory location; and provide the generated actions to a backup system. The backup system may apply the generated actions to a first backup associated with the first snapshot to produce a second backup associated with the second snapshot.

18 Claims, 15 Drawing Sheets

(56) References Cited

U.S. PATENT DOCUMENTS

| | | | | |
|---|---|---|---|---|
| 2014/0040199 | A1* | 2/2014 | Golab | G06F 16/211 707/634 |
| 2015/0350006 | A1* | 12/2015 | Bhargava | H04L 63/04 709/202 |
| 2017/0060898 | A1* | 3/2017 | Lu | G06F 3/0689 |
| 2017/0220777 | A1* | 8/2017 | Wang | G06F 21/6218 |
| 2020/0073978 | A1* | 3/2020 | Dain | G06F 16/2365 |
| 2021/0042411 | A1* | 2/2021 | Annen | G06N 3/08 |
| 2021/0044603 | A1* | 2/2021 | Annen | G06N 20/00 |
| 2021/0044604 | A1* | 2/2021 | Annen | G06F 21/565 |

OTHER PUBLICATIONS

Ashwin Pawar, "FAQ on SnapDiff", NetApp, 23 pages, Mar. 2016.
"Write Anywhere File Layout", Wikipedia, Retrieved from "//en.wikipedia.org/w/index.php?title=Write_Anywhere_File_Layout&oldid=972560983", 7 pages, Aug. 12, 2020.
Stefan Radtke, "Use Isilon's new change-list feature to accelerate your backus",Stefan Radtke's Blog, 10 pages, Jul. 22, 2014.
Torbjorn Granlund et al, "cp(1)-Linux manual page", Linux/UNIX system programming training, 4 pages, Aug. 13, 2020.
"Volume Shadow Copy Service", Microsoft Docs, 21 pages, Jan. 30, 2019.
"ZFS", Wikipedia, Retrieved from "//en.wikipedia.org/w/index.php?title=ZFS&oldid=978693503", 30 pages, Sep. 16, 2020.
Ohad Rodeh, "B-trees, Shadowing, and Clones", IBM Haifa Research Labs, ACM Transactions on Computational Logic, vol. V, No. N., 26 pages, Aug. 2007.
Ohad Rodeh et al., "BTRFS: The Linux B-tree Filesystem", IBM Research Report, RJ10501 (ALM1207-004), 37 pages, Jul. 9, 2012.
"Server-Side Copy", Wikipedia, Retrieved from "//wiki.samba.org/index.php?title=Server-Side_Copy&oldid=16111", 6 pages, Sep. 18, 2020.
NFOA in Related U.S. Appl. No. 17/119,959 dated Mar. 25, 2022.
Non-Final Office Action issued in Related U.S. Appl. No. 17/119,959 dated Dec. 11, 2020.
Non-Final Office Action issued in Related U.S. Appl. No. 17/960,023 dated Apr. 13, 2023.

* cited by examiner a/b/c/foo.txt ~ 412B

MOVE 'c/foo.txt' to directory 'b' ~ 422B

| 432B | 10 | 11 | 12 | 13 |
|---|---|---|---|---|
| 434B | a | b | c | foo.txt |
| 436B |   | a | b | c |

| 442B | 10 | 11 | 12 | 13 |
|---|---|---|---|---|
| 444B | a | b | c | foo.txt |
| 446B |   | a | b | b |

-4, RENAME, "a/b/c/foo.txt", ".vdfs/13"  ~ 452B
3, RENAME, ".vdfs/13", "a/b/foo.txt"  ~ 454B a/b/c/foo.txt ~ 512B RENAME 'foo.txt' to 'bar.txt' ~ 522B -4 , RENAME , "a/b/c/foo.txt" , " .vdfs/13" ~ 552B
4 , RENAME , ".vdfs/13" , "a/b/c/bar.txt" ~ 554B a/b/c/foo.txt ~ 612B MOVE 'c/foo.txt' to directory 'b' ~ 622B
RENAME 'foo.txt' to 'bar.txt' ~ 624B -4 , RENAME , "a/b/c/foo.txt" , " .vdfs/13" ~ 652B
3 , RENAME , ".vdfs/13" , "a/b/bar.txt" ~ 654B a/b/c/foo.txt ~ 812 a/b/c/bar.txt ~ 814 a/b/qux.txt ~ 816

```
820
DELETE 'bar.txt' ~ 821
MOVE 'foo.txt' to directory 'b' ~ 822
RENAME 'foo.txt' to 'baz.txt' ~ 823
DELETE 'c' ~ 824
ADD NEW FILE 'xyzzy.txt' in directory 'b' ~ 825
MODIFY qux.txt ~ 826
```

830

| 832 | 10 | 11 | 12 | 13 | 14 | 15 |
|---|---|---|---|---|---|---|
| 834 | a | b | c | foo.txt | bar.txt | qux.txt |
| 836 |  | a | b | c | c | b |

840

| 842 | 10 | 11 | 13 | 15 | 16 |
|---|---|---|---|---|---|
| 844 | a | b | baz.txt | qux.txt | xyzzy.txt |
| 846 |  | a | b | b | b |

FIG. 8A

```
850
-3 , DELETE_DIR , "a/b/c"  ~ 851
-4 , RENAME , "a/b/c/foo.txt" , " .vdfs/13" ~ 852
 3 , RENAME , ".vdfs/13" , "a/b/baz.txt" ~ 853
-5 , DELETE_FILE , "bar.txt"  ~ 854
 3 , CREATE_FILE , "a/b/xyzzy.txt"  ~ 855
 3 , UPDATE, "qux.txt"  ~ 856
```

```
860
-5 , DELETE_FILE , "bar.txt"  ~ 854
-4 , RENAME , "a/b/c/foo.txt" , " .vdfs/13" ~ 852
-3 , DELETE_DIR , "a/b/c"  ~ 851
 3 , RENAME , ".vdfs/13" , "a/b/baz.txt" ~ 853
 3 , CREATE_FILE , "a/b/xyzzy.txt"  ~ 855
 3 , UPDATE, "qux.txt"  ~ 856
```

FIG. 8B

EFFICIENT EXPORT OF SNAPSHOT CHANGES IN A STORAGE SYSTEM

BACKGROUND

A backup is a copy of computer data taken and stored elsewhere so that it may be used to restore the original after a data loss event. For example, a storage system can use backups to recover lost data from data deletion or corruption, or to recover data from an earlier time. The storage system can create snapshots to preserve the state of the data and applications on the storage system. Differences between the snapshots describe the changes in data between an initial copy and a subsequent copy. Backup systems can make an initial full copy of the data to be backed up. For subsequent backups, the backup system can query for changes in snapshots since the last backup and only fetch the changed data. Since the changes between the initial copy and a later copy are typically only a subset of the full data, transferring the changed data takes less time and consumes less bandwidth than transferring the full data. In addition, less storage is consumed to store the changed data than the full data.

In some types of systems, modifications to data change directories and files in a filesystem. Typically, the storage system may report filesystem changes to a backup system as operations of addition, deletion, or modification. To perform these operations, the backup system may have to perform rename and move operations of existing data. For example, the storage system may report a rename or move operation as deleting a file/directory from its original location followed by the recreating of a new file/directory at a new location. Recreating the file/directory involves substantial data transfer to send a copy of the data from the storage system to the backup system. Transferring the file/directory is inefficient, because the data in the file/directory did not change and a copy of the data was already in the backup system (before its unnecessary deletion).

BRIEF DESCRIPTION OF THE DRAWINGS

FIGS. 8A and 8B depict additional example keymaps, actions, and level values, according to certain embodiments.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

I. Overview

The present disclosure describes techniques for using a filesystem volume snapshot to efficiently backup a system volume. A filesystem can use a tree data structure, known as a filesystem tree, to store logical to physical mappings for directories and files. For example, the filesystem tree is a copy-on-write (COW) B-tree. Some embodiments use the filesystem tree—recorded at a particular time—as a filesystem volume snapshot. In other words, a filesystem volume snapshot (hereinafter "snapshot") is a point-in-time copy of the filesystem state. Differences between an initial snapshot (corresponding to initial data) and a subsequent snapshot (corresponding to subsequent data) can be used to determine data that changed from the initial data to the subsequent data. The storage system can report a list of actions to a backup system to allow the backup system to construct a backup copy of the changes from the initial data.

The filesystem trees (and hence the snapshots) are comprised of keys. The keys may be sequentially identified with a key number (e.g., comprising numbers, letters, numbers and letters, and the like) and each key may correspond to metadata about a file/directory. In addition, the filesystem also stores the name of the file/directory, and back pointers that can be used to determine the file's/directory's tree structure. A keymap for a snapshot—incorporating each key in the snapshot in order of key number, a name for each key, and a directory tree—is generated using the snapshot, file/directory names, and back pointers. The keymaps for the initial snapshot and subsequent snapshot are compared to find changes to data. This process of comparing snapshots is advantageously efficient for determining differences between the initial data and subsequent data.

When a difference between keymaps is found, one or more actions can be generated. A level value that represents the depth of the directory for each action can also be generated, so that the actions are performed without order of execution conflicts arising. The actions are ordered by level value and reported to the backup system. According to various embodiments, changes to data can be reported to the backup system as delete, create, modify, and rename actions. The rename action as described herein can eliminate inefficiencies that arise from reporting rename and move operations, which previously were reported as requiring delete and create operations.

II. System Architecture

Figure 1:
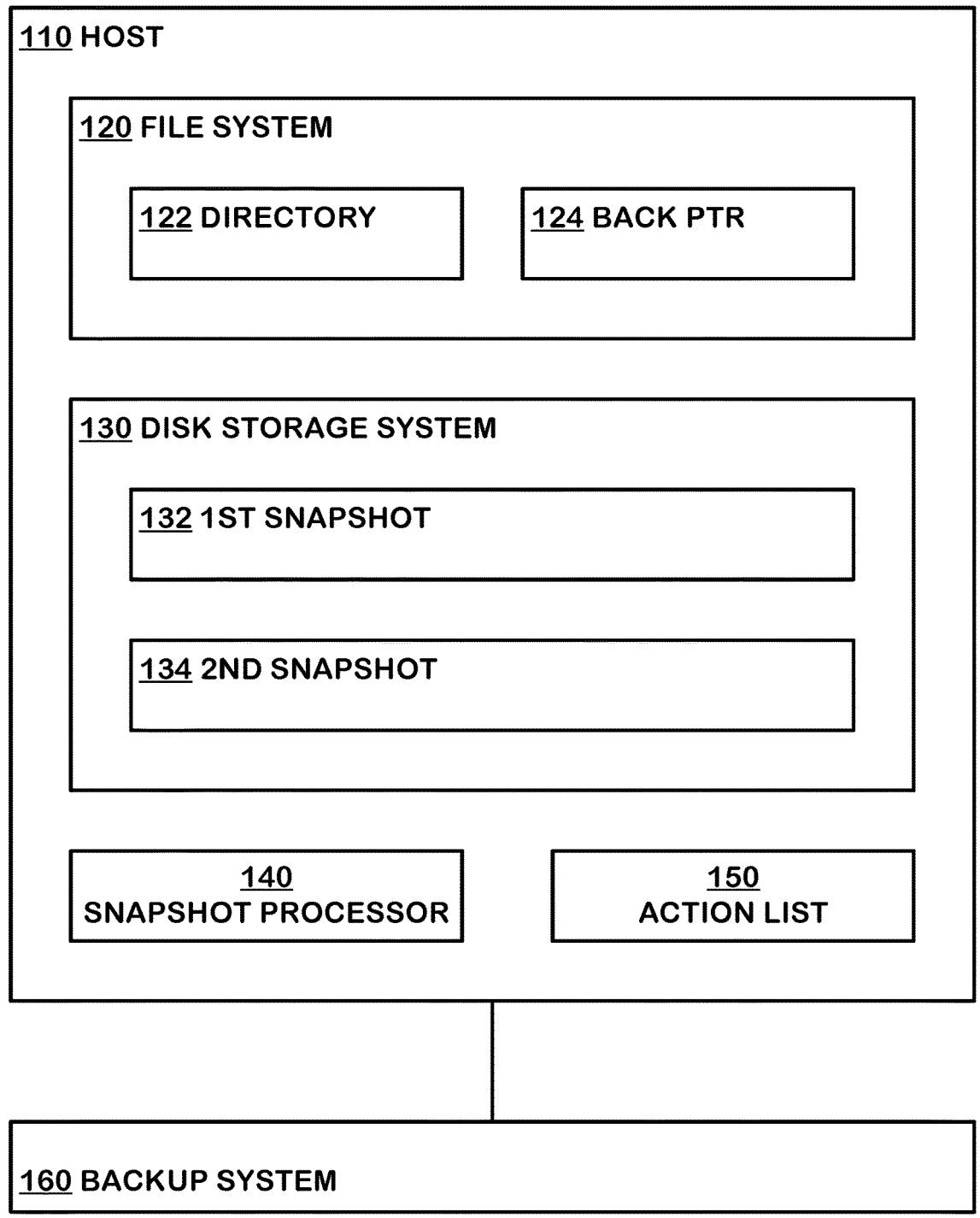
FIG. 1 is a simplified block diagram illustrating a system according to certain embodiments.

FIG. 1 depicts a system 100 for data storage and backup according to some embodiments. System 100 may include a host 110 and a backup system 160. In various embodiments, host 110 is a storage system for storing and retrieving data. For example, host 110 is part of a virtual storage area network (VSAN), but different types of storage systems may be used. As shown, host 110 includes a filesystem 120, a disk storage system 130, a snapshot processor 140, and an action list 150. Filesystem 120 controls how files are stored in and retrieved from disk storage system 130. In some embodiments, filesystem 120 is a Portable Operating System Interface (POSIX) compliant system where data is organized in directories and files. For example, filesystem 120 may include directory 122 and back pointers 124. Files may be separated into groups called directories. Directory 122 includes information about (file and directory) names assigned to inodes. An inode is a data structure—typically in a Unix-style filesystem—which stores the properties of a file and directories. Back pointers 124 include back pointers that indicate a parent of a file/directory and may be used to determine the file's/directory's path. A path points to a filesystem location by following the directory tree hierarchy expressed in a string of characters in which path components, separated by a delimiting character (e.g., "/"), represent each directory. For example, if file "foo.txt" is in directory "a," then file "foo.txt" has a back pointer to directory "a." By way of further non-limiting example, if directory "a" is a subdirectory of directory "b," then directory "a" has a back pointer to directory "b."

Disk storage system 130 can provide persistent (e.g., non-volatile) storage for program and data files, and can include a magnetic or solid-state hard disk drive, a removable flash memory-based drive or card, and/or other types of storage media. A filesystem volume can be stored in disk storage system 130. In various embodiments, Disk storage system 130 may store data that is backed up on a backup system 160. Also, disk storage system 130 includes a first snapshot 132 and a second snapshot 134. First snapshot 132 and second snapshot 134 are point-in-time copies of filesystem trees, which may be used to determine changes in data from an initial copy and a subsequent copy. Filesystem trees store the filesystem state, such as logical to physical mappings for directories and files, that are stored in disk storage system 130. For example, filesystem trees store inodes. By way of further example, a filesystem tree is a copy-on-write (COW) B-tree.

Snapshot processor 140 processes snapshots (e.g., first snapshot 132 and second snapshot 134) to determine data changes between the snapshots. Snapshot processor 140 may generate an action list 150, which reports operations to perform to represent the data changes in backup system 160. Host 110 may include workloads (e.g., virtual machines and containers) on which snapshot processor 140 runs. Host 110 may further include hardware—such as one or more processors (e.g., x86, Arm®, etc.), memory (e.g., dynamic random access memory (DRAM), static random access memory (SRAM), electrically erasable programmable read-only memory (EEPROM), flash memory, etc.), network interface controller, and the like—for hosting the workloads.

Backup system 160 may duplicate the state, files, and data of host 110 to be used as a backup or data substitute when disk storage system 130 is corrupted, deleted, or otherwise lost. Usually, host 110 and backup system 160 are separate systems. For example, host 110 sends a full copy of initial data over a secure proprietary or public network to backup system 160, which is a backup of the initial data. To backup subsequent data, host 110 sends the changes to the initial data (e.g., in the form of action list 150) and the required modified data to enact the changes. Action list 150 may handle move or rename operations between two snapshots more efficiently by renaming or moving a file without having to delete or create the file as will be described in more detail below.

III. Snapshots

Figure 2:
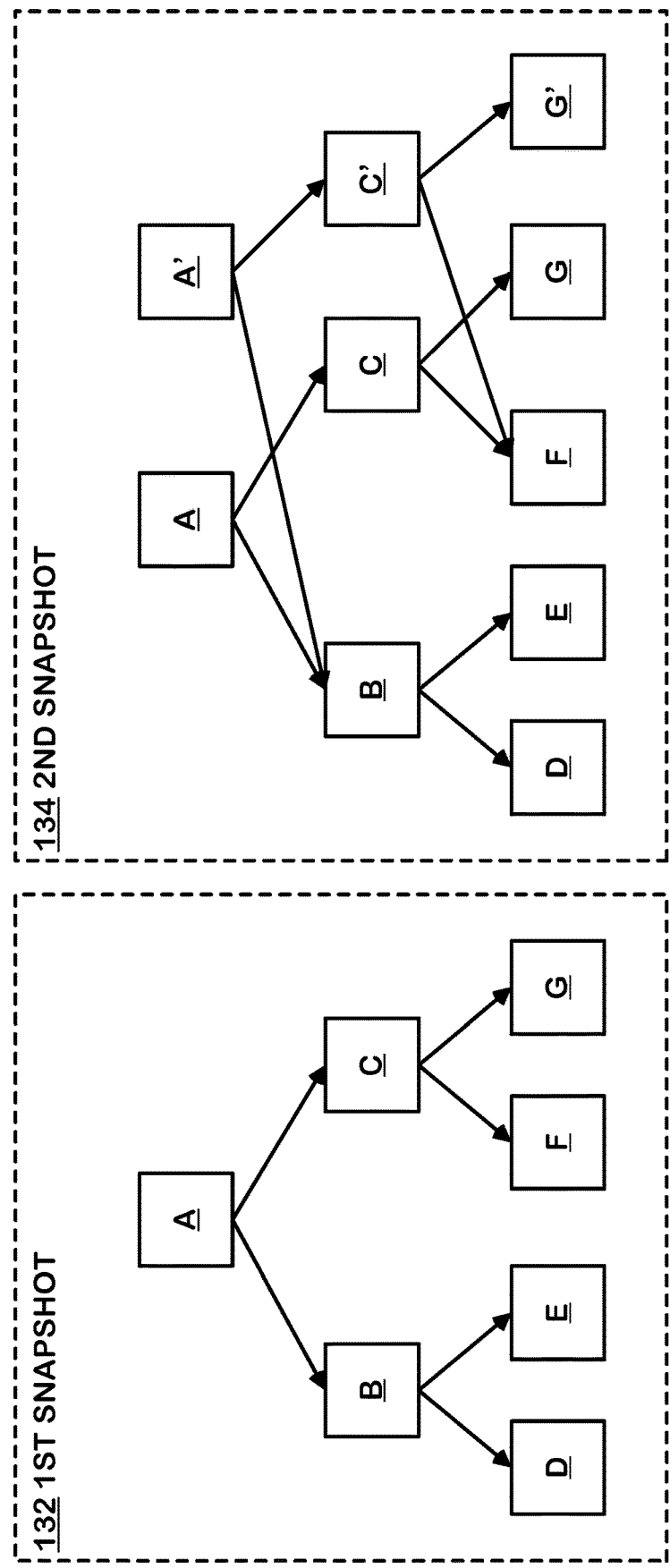
FIG. 2 depicts example copy-on-write snapshots according to certain embodiments.

FIG. 2 illustrates snapshots 200 in accordance with some embodiments. As shown, snapshots 200 include first snapshot 132 and second snapshot 134. Typically, second snapshot 134 may be chronologically newer than first snapshot 132, which means that snapshot 134 is created at a later point in time than first snapshot 132.

Some embodiments store a point-in-time copy of a filesystem tree (referred to as a snapshot) to record the filesystem state. Filesystem 120 uses a filesystem tree to store logical to physical mappings for directories and files. For example, the filesystem tree stores keys, such as index nodes (inodes). Modes are a data structure in the filesystem (e.g., filesystem 120) that describe a file-system object, such as a file or a directory. Each inode may store the attributes and disk block locations of the object's data. File-system object attributes may include metadata (e.g., date/time of last change, access, and modification), owner data, permission data, and the like. Usually, inodes do not store the filesystem object's name or actual data. Directories (e.g., directory 122) includes lists of names assigned to inodes.

The disk block information may be a list of blocks or extents for a file. The list of blocks identifies locations in the filesystem where the file is located. Each block in the list of blocks may have a composite key number. The composite key number may be the file's key number plus a file offset. The blocks in the list of blocks may be arranged in order (from smallest to largest) of their composite key numbers.

The filesystem tree (and hence snapshots 200) may be in a data structure, such as a B-tree data structure. For example, B-trees may be a self-balancing tree data structure that keeps data sorted and allows searches, sequential access, insertions, and deletions. Here, sorted means that the nodes in the B-tree stores keys (e.g., inodes) in ascending (from smallest to largest) order. B-trees may be used by the filesystem, because they reduce the number of disk reads to find a particular block in a disk. As shown, first snapshot 132 includes nodes A, B, C, D, E, F, and G. Second snapshot 134 includes nodes A', B, C', D, E, F, and G'. The nodes represent keys in the data structure.

According to various embodiments, the filesystem tree is a copy-on-write (COW) B-tree. When a directory or a file in the filesystem volume is changed, the filesystem updates the COW B-tree. In the following example, first snapshot 132 represents the filesystem tree for the initial data and second snapshot 134 represents an active filesystem tree that reflects changes to the initial data. Suppose a file/directory is changed and the key (e.g., inode) for the file/directory is in node G. Instead of changing node G in place, a whole new node G' is added—appended as shown in second snapshot 134—to the active COW B-tree. Node G' is a copy of node G, except it has an updated inode for the changed file/directory. Node G' in effect replaces node G. Each parent node of node G (e.g., nodes C and A) is updated to point to node G' instead of node G. When a parent node is updated, a whole new node is similarly added to the active COW B-tree. Accordingly, node C' is added—appended as shown in second snapshot 134—to the active COW B-tree. Node C' is a copy of node C, except it points to node G' instead of node G. Node C' replaces node C. Node A' is also added in a similar manner. The active COW B-tree (e.g., second snapshot 134) may be saved as a snapshot at any time. When the snapshot is saved, the whole B-tree is not necessarily copied. Instead, only the nodes that are modified (e.g., nodes A', C', and G') are advantageously copied.

IV. Generating an Action List

Action list 150 may represent the changes between snapshots. Snapshot processor 140 generates action list 150 in a way to allow backup system 160 to perform rename operations without causing significant data transfer between storage system 130 and backup system 160. Snapshot processor 140 generates a rename operation as two operations. A first operation moves a source into a temporary location and a second operation moves the source from the temporary location to the final location. To properly perform the rename operation, snapshot processor 140 may follow a process to ensure changes to the snapshots are properly reflected.

Figure 3A:
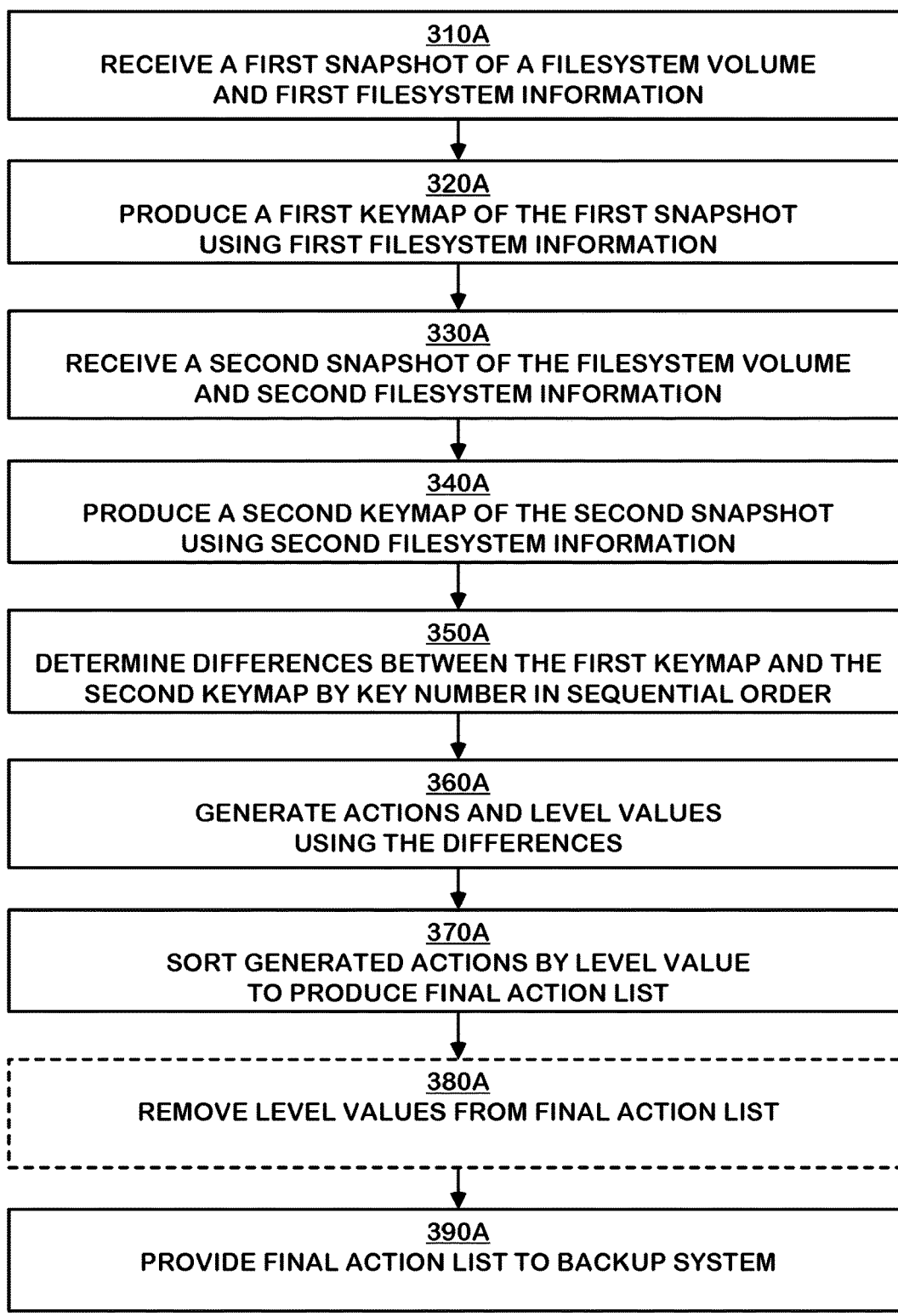
FIG. 3A depicts a flow diagram illustrating a method for exporting snapshot changes according to certain embodiments.

FIG. 3A depicts a workflow 300A that may be executed by system 100 of FIG. 1 for producing an action list 150 according to some embodiments. Although workflow 300A is described in conjunction with system 100, other systems may be used to perform the methods described herein. Workflow 300A is also described with reference to FIG. 3B.

Workflow 300A may commence at 310A where snapshot processor 140 receives a first snapshot 132 of a filesystem volume from disk storage system 130 and information (referred to as first filesystem information) from directory 122 and back pointers 124. The first filesystem information reflects the state of the filesystem at the time the first snapshot is taken/created. In other words, data from directory 122 and back pointers 124 is contemporaneous with the first snapshot 132. At 320A, snapshot processor 140 produces a first keymap 330B of the first snapshot 132 using the first filesystem information.

At 330A, snapshot processor 140 receives a second snapshot 134 of a filesystem volume from disk storage system 130 and information (referred to as second filesystem information) from directory 122 and back pointers 124. The second filesystem information reflects the state of the filesystem at the time the second snapshot is taken/created. As noted above, the second snapshot 134 may be created at a later point in time than the first snapshot 132. At 340A, snapshot processor 140 produces a second keymap 340B of the second snapshot 134 using the second filesystem information.

Figure 3B:
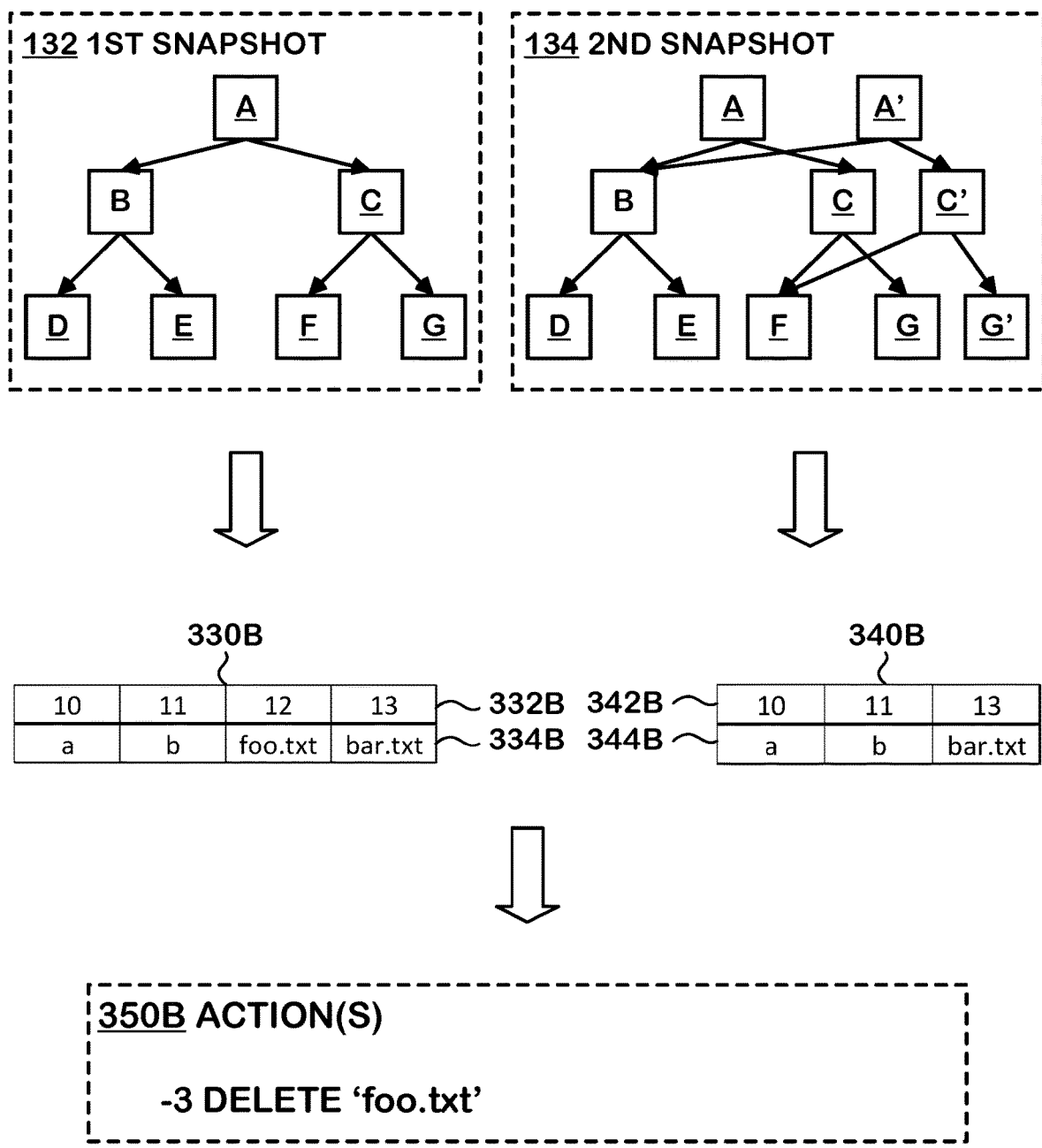
FIG. 3B is an example of exporting snapshot changes according to certain embodiments.

Keymaps contain information (e.g., from snapshot 132 or 134, directory 122, and back pointers 124) for each filesystem object in its respective snapshot. Keymaps may be compared to each other to identify changes in the filesystem. In FIG. 3B, first keymap 330B and second keymap 340B each depict a portion of a keymap for illustrative purposes. In some embodiments, the keymaps include keys 332B and 342B from the B-trees in sequential order (e.g., smallest to largest). For example, the keys may be inodes. Associated with each key may be a name 334B and 344B for each filesystem object (e.g., file or directory) and a path (not depicted in FIG. 3B). Snapshot processor 140 determines names using directory 122 and determines the paths using back pointers 124.

Referring back to FIG. 3A, at 350A, snapshot processor 140 determines differences between the first keymap 330B and the second keymap 340B. Snapshot processor 140 may compare the keys in the first keymap 330B and the second keymap 340B in sequential order (e.g., smallest to largest).

An example difference shown in FIG. 3B is: key 12 is present in first keymap 330B and is not present in second keymap 340B.

At 360A, when snapshot processor 140 encounters a difference, snapshot processor 140 generates one or more actions and determines a level value for each action. Actions may include create, delete, modify, and rename file/directory operations. In the example of FIG. 3B, the difference indicates that file "foo.txt," corresponding to key 12, is removed in the second snapshot 134. Accordingly, snapshot processor 140 generates a delete action 350B to remove file "foo.txt."

The level value may be a depth of the number of components in the path. For example, the level value for directory "/a" is 1; the level for file "/foo/bar/xyz.txt" is 3; and the level for file "/a/b/c/baz.txt" is 4. Snapshot processor 140 uses the level value to order operations in action list 150. In some embodiments, snapshot processor 140 follows a scheme to ensure changes are properly represented in backup system 160. For example, since a destination for a move/rename operation may be a new (newly created) directory, the move/rename action should occur after the create directory action. Otherwise, there will not be a place to put the file if it is moved/renamed before the destination exists. Since a file-system object having the same name can be deleted and then created, delete actions should precede create actions. In nested delete operations, child file-system objects should be deleted before their respective parent file-system objects. In nested create operations, the parent file-system object should be created before the child file-system object. Otherwise, there will not be a place to put the child file-system object if it is created before the parent file-system object exists.

The level value may be positive or negative depending on the action. The positive or negative value ensures that after sorting by level value, the operations will be executed in the proper order. For example, in a rename operation, a target directory will be present when backup system 160 moves the file or directory from the temporary directory to the target directory. In some examples, create actions may have a positive level value, delete actions may have a negative level value, rename actions may have either a positive or negative level value. Negative level values are smaller than positive level values. The level values determine the order (from smallest to largest level value) in which the actions are performed by backup system 160. The first rename operation may have a negative value and the second rename operation may have a positive value. If actions are sorted from negative to positive, this ensures the target directory is present before the second operation is performed (by backup system 160) because the second operation will be performed (by backup system 160) after a creation of the target directory, as will be discussed below. In the example of FIG. 3B, the delete action has a level value of −3.

At 370A, snapshot processor 140 may sort the generated actions by level value (e.g., smallest to largest) to produce a final action list 150. For example, snapshot processor 140 considers negative actions as smaller than positive actions. Sorting the generated actions by level value may advantageously prevent contention that can arise when the generated actions—having different level values—are performed in any order on backup system 130. When backup system 160 requests changes since the last backup (snapshot), snapshot processor provides action list 150 (and changed data). Actions having the same level value can be performed in any order by backup system 130 without contention.

Since backup systems do not use the level values, snapshot processor 140 may optionally remove the level values from the final action list at 380A. At 390A, snapshot processor 140 may provide the final action list to backup system 160. Backup system 160 may already store a copy of the volume corresponding to the first snapshot. By performing the actions in the final action list in sequential order (e.g., from smallest to largest level value) on the copy of the volume, backup system 160 alters the copy of the volume to correspond to the second snapshot. In other words, backup system 160 generates a backup of the data corresponding to the second snapshot from an earlier backup. Generating a backup in this way is faster than copying the entire volume from disk storage system 130, which could involve transferring hundreds of terabytes of data.

Accordingly, some embodiments may minimize inefficiently copying/transferring data that has not changed. For example, moving a file to a new (e.g., newly created) directory cannot be a simple rename operation for a backup, because a backup snapshot does not have the new directory, yet. By way of further non-limiting example, moving all the files in one directory to a new directory and deleting the original directory may involve copying even more data (e.g., multiple files) that has not changed between snapshots. Since the backup snapshot does not have the new directory, a backup system may first delete all of the files in the original directory and then copy all the files again after creating the new directory. Such extra copying is inefficient, because unchanged files are copied/transferred.

As discussed above, snapshot processor 140 can identify differences between the first snapshot 132 and the second snapshot 134. The differences indicate how the data has changed between snapshots and actions (and an order in which to perform the actions) that backup system 160 can apply to change initial backup data (corresponding to first snapshot 132) into subsequent backup data (corresponding to second snapshot 134). The following will describe identifying several differences and generated actions associated with the differences.

V. Moving and Renaming Files

Figure 4A:
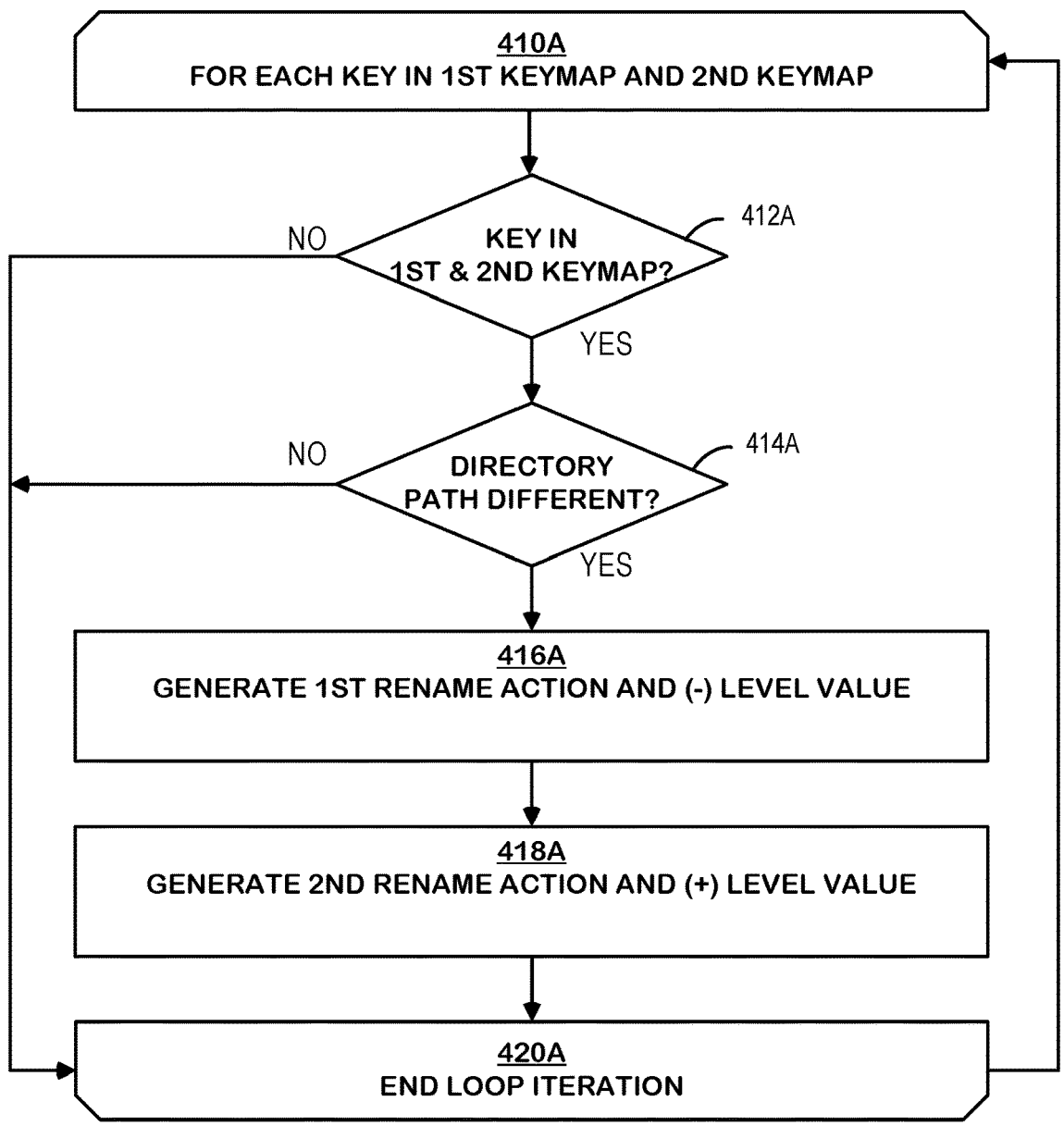
FIG. 4A is a flow diagram showing a method for identifying a directory move and generating associated actions and level values, according to certain embodiments.
Figure 4B:
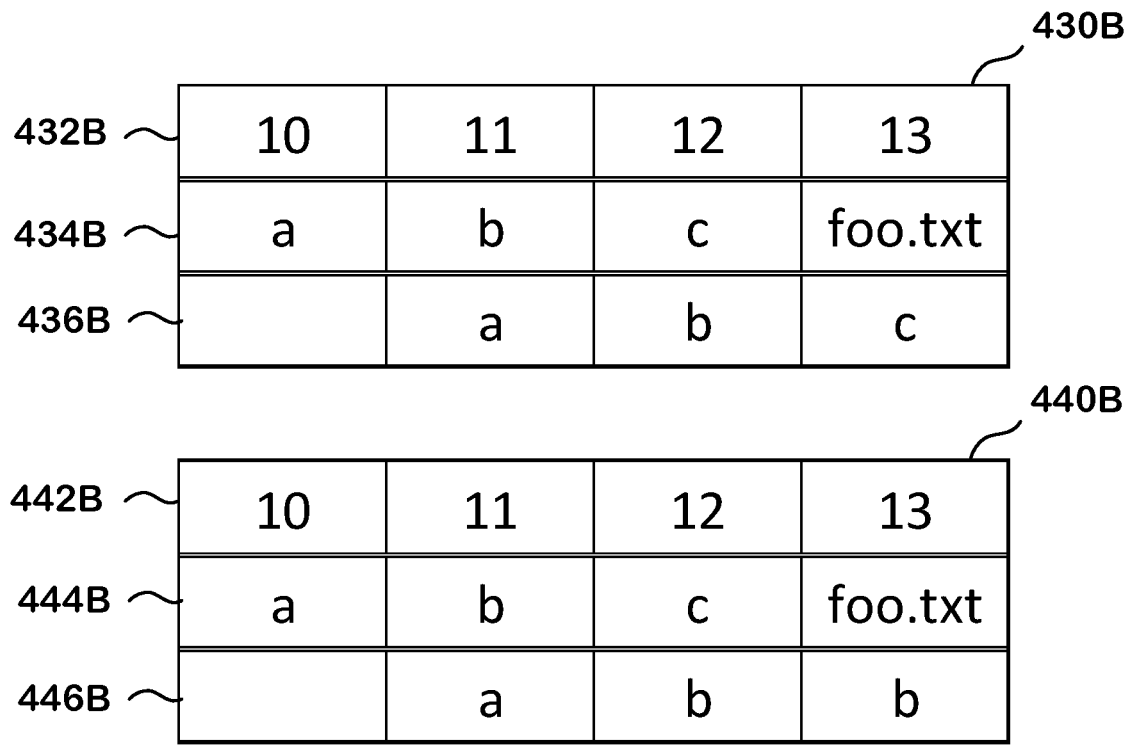
FIG. 4B is an example of identifying a directory move and generating associated actions and level values to reproduce it at a backup system.

FIG. 4A illustrates workflow 400A for detecting when a file/directory is moved in a filesystem volume and generating corresponding actions according to various embodiments. Although workflow 400A is described in conjunction with system 100, other systems may be used to perform the described methods. Workflow 400A is described with reference to FIG. 4B. As shown in FIG. 4B, file (434B) "foo.txt" starts in directory "a/b/c". Between a first snapshot (e.g., first snapshot 132) and a second snapshot (e.g., second snapshot 134), move operation 422B moves "foo.txt" to directory "a/b." First keymap 430B and second keymap 440B show portions of keymaps for illustrative purposes. The following depicts the processing of this change to generate action list 150.

Referring to FIG. 4A, at 410A, snapshot processor 140 may enter a loop for each key in a first keymap and a second keymap. Within the loop, at 412A, snapshot processor 140 checks whether a key is in both the first keymap (e.g., 430B) and the second keymap (e.g., 440B). If the key is in both the first keymap and the second keymap, at 414A, snapshot processor 140 checks whether the directory path associated with the key is different between the first keymap and the second keymap. In the example of FIG. 4B, comparing key numbers 432B and key numbers 442B, key numbers 10, 11, and 12 do not indicate a change and no actions are generated.

However, key number 13 has changed directories. In the first keymap 430B, file "foo.txt" (corresponding to key number 13) has a back pointer 436B indicating it is in directory "c." Directory "c" has a back pointer to directory "b" indicating directory "c" is a subdirectory of directory "b", and so on. Accordingly, in the first keymap 430B, file "foo.txt" is in directory "a/b/c." In the second keymap 440B, file "foo.txt" (still corresponding to key number 13) has a back pointer 446B indicating it is in directory "b." Tracing through back pointers 446B, file "foo.txt" is in directory "a/b" in the second keymap 440B. Thus, the directory paths for file "foo.txt" changed between the first keymap 430 and the second keymap 44B. If the directory path is different, workflow 400A may proceed to 416A.

Referring to FIG. 4A, at 416A, snapshot processor 140 generates a first rename action 452B with a negative level value. The value is negative because this is the first rename operation to the temporary directory. For example, the first rename action moves the file to a temporary or scratch directory (".vdfs") when the action is performed by backup system 160. The temporary directory is used as a temporary place holder for files. Typically, backup system 160 creates the temporary directory before (or while) applying actions in action list 150 and removes the temporary directory after action list 150 is applied.

At 418A, snapshot processor 140 generates a second rename action with a positive level value. For example, in FIG. 4B, the second rename action 454B with a level value of "3" moves file foo.txt from the temporary directory ".vdfs" to the destination directory "a/b" when executed by backup system 160. The value is positive because this is the second rename operation to the destination. For instances where the destination directory is a new directory (e.g., a key corresponding the destination directory is not in the first keymap), the second rename action creates the new directory as described in FIG. 7A. For instances where the source directory is deleted (e.g., a key corresponding the source directory is not in the second keymap), a delete action removes the source directory as described in FIG. 7B.

Following 418A, or when the conditions evaluated at steps 412A or 414A are not met, snapshot processor 140 terminates the current loop iteration (420A) and snapshot processor 140 can return to the start of loop 410A to process further keys. Once all the keys in the first keymap and in the second keymap have been processed, workflow 400A may end.

Figure 5A:
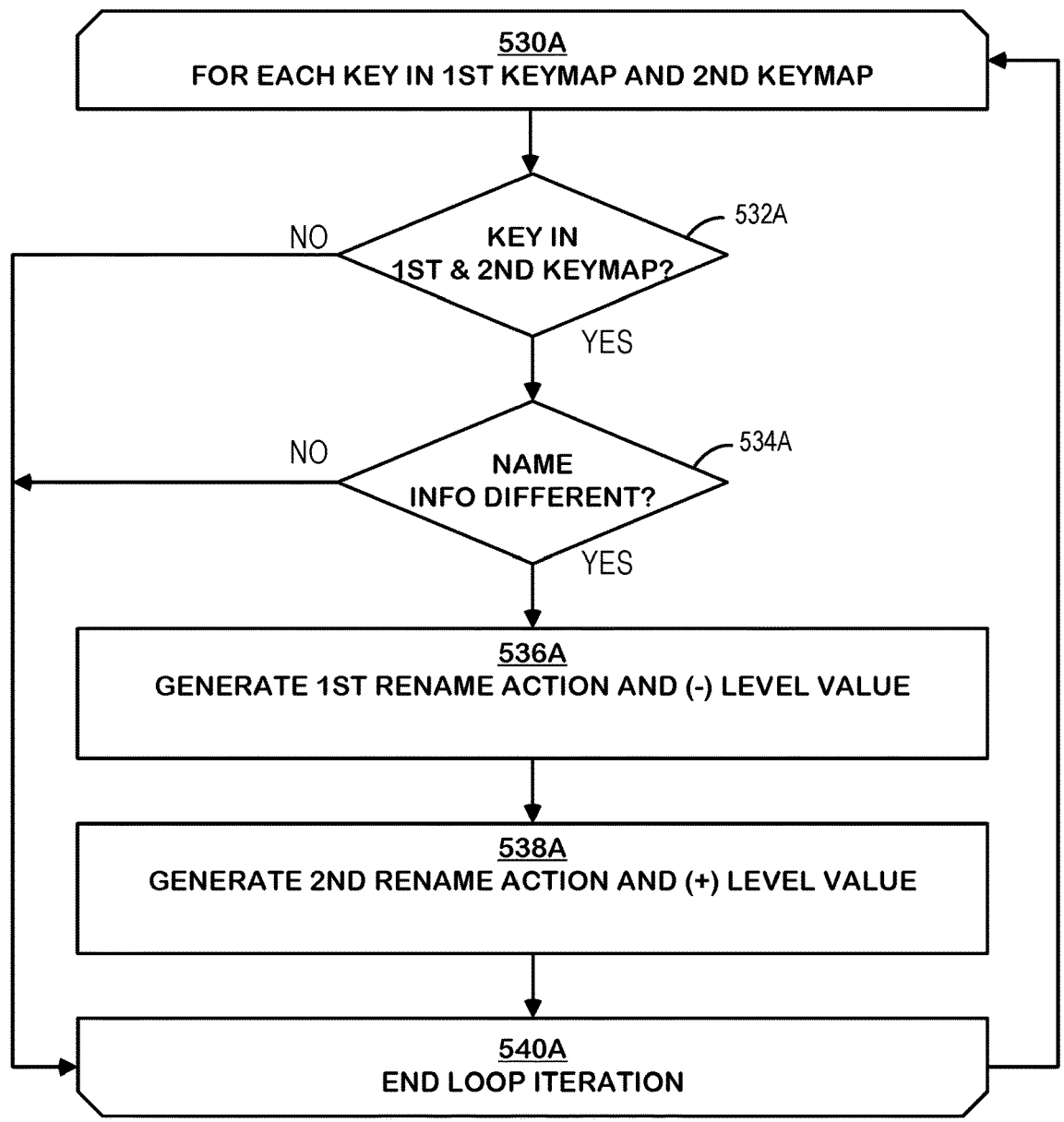
FIG. 5A is a flow diagram showing a method for identifying a directory move and generating associated actions and level values, according to certain embodiments.

FIG. 5A illustrates workflow 500A for detecting when a file/directory is renamed in a filesystem volume and generating actions for the change according to some embodiments. Although workflow 500A is described in conjunction with system 100 (FIG. 1), other systems may be used to perform the described methods. Workflow 500A is described with reference to FIG. 5B, where file "foo.txt" starts in directory "a/b/c" (512B). Rename operation 522B renames "foo.txt" to "bar.txt." First keymap 530B and second keymap 540B each illustrate a portion of a keymap.

Figure 5B:
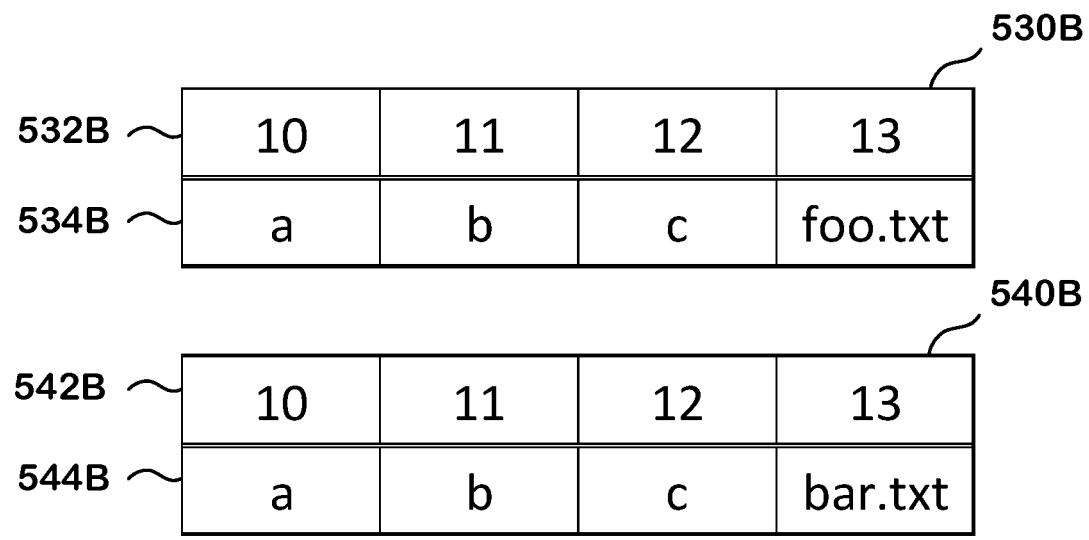
FIG. 5B is an example of identifying a renamed file and generating associated actions and level values to reproduce it at a backup system.

Referring to FIG. 5A, at 530A, snapshot processor 140 may enter a loop for each key in a first keymap and a second keymap. Within the loop, at 532A, snapshot processor 140 checks whether a key is in both the first keymap (e.g., 530B) and the second keymap (e.g., 540B). If the key is in both the first keymap and the second keymap, at 534A, snapshot processor 140 checks whether the filename is different between the first keymap and the second keymap. If so, workflow 500A may proceed to 536A. In the example of FIG. 5B, comparing names of files or directories at 534B (corresponding to key numbers 532B) to names of files or directories at 544B (corresponding to key numbers 542B), key numbers 10, 11, and 12 do not indicate a change and snapshot processor 140 generates no actions. However, key number 13 has changed names from "foo.txt" to "bar.txt".

Referring to FIG. 5A, at 536A, snapshot processor 140 generates a first rename action with a negative level value. For example, the first rename action 552B with a negative level value −4 (when performed by backup system 160) moves the file "foo.txt" to a temporary or scratch directory ".vdfs." The temporary directory is used as a temporary place holder for files. Typically, backup system 160 creates the temporary directory before (or while) action list 150 is applied and removed after action list 150 is applied.

At 538A, snapshot processor 140 generates a second rename action with a positive level value. For example, second rename action 554B with a positive level value "4" (when performed by backup system 160) moves the file from the temporary directory to the destination directory "a/b/c" and renames the file "bar.txt."

In FIGS. 4A to 5B, the first rename actions 452B and 552B and the second rename actions 454B and 554B (when performed by backup system 160), advantageously keep data—which does not change—on backup system 160. In contrast, backup systems may receive instructions from other storage systems to delete a file/directory at its original location and recreate the same file/directory at a new location, resulting in an unnecessary transfer of a potentially large amount of data.

Following 538A, or when the conditions evaluated at steps 532A or 534A are not met, the current loop iteration can terminate (540A) and workflow 500A can return to the start of loop 530A to process further keys. Once all the keys in the first keymap and in the second keymap have been processed, workflow 500A may end.

Figure 6A:
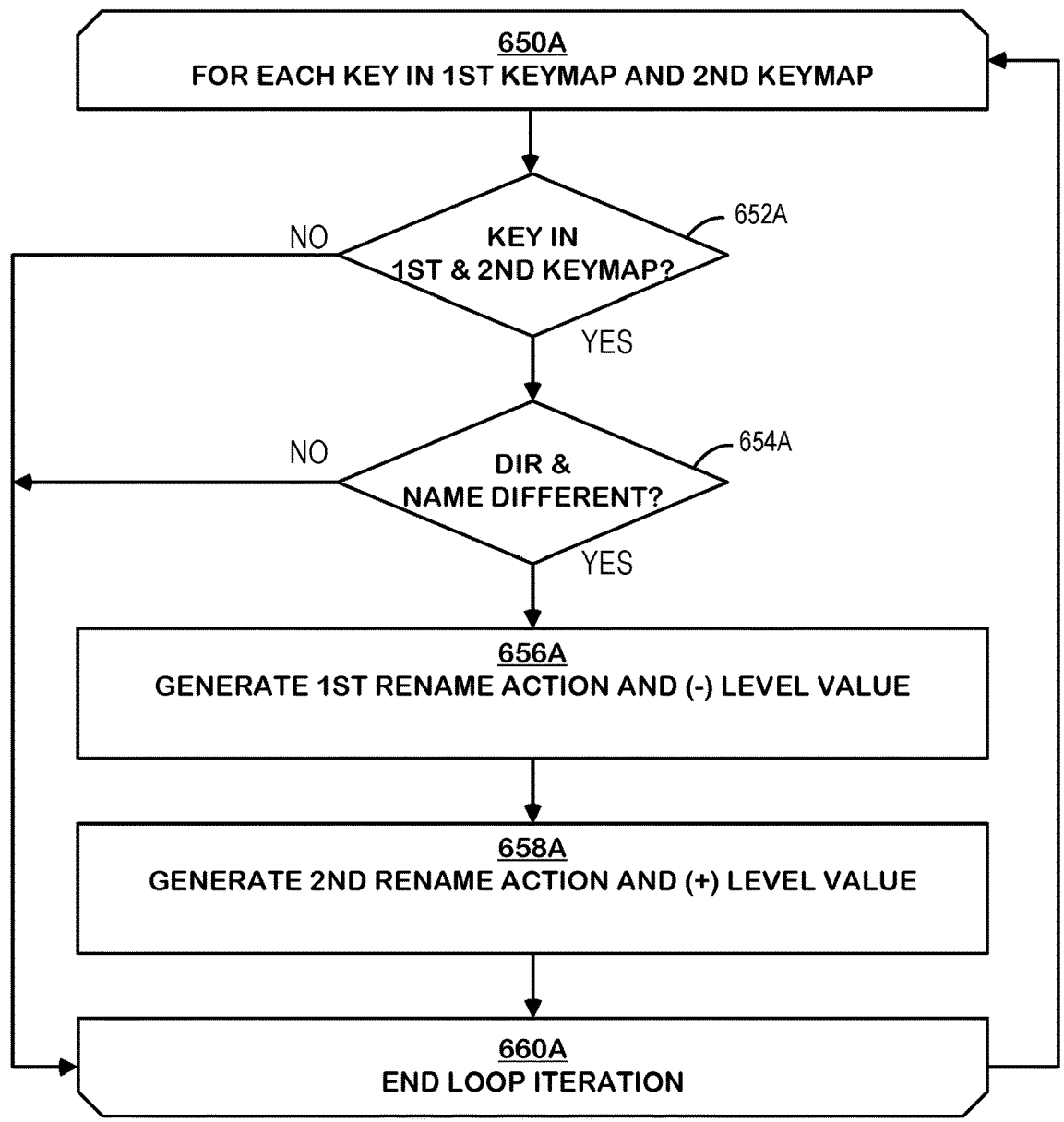
FIG. 6A is a flow diagram showing a method for identifying a file that has been renamed and moved to a different directory, and generating associated actions and level values, according to certain embodiments.
Figure 6B:
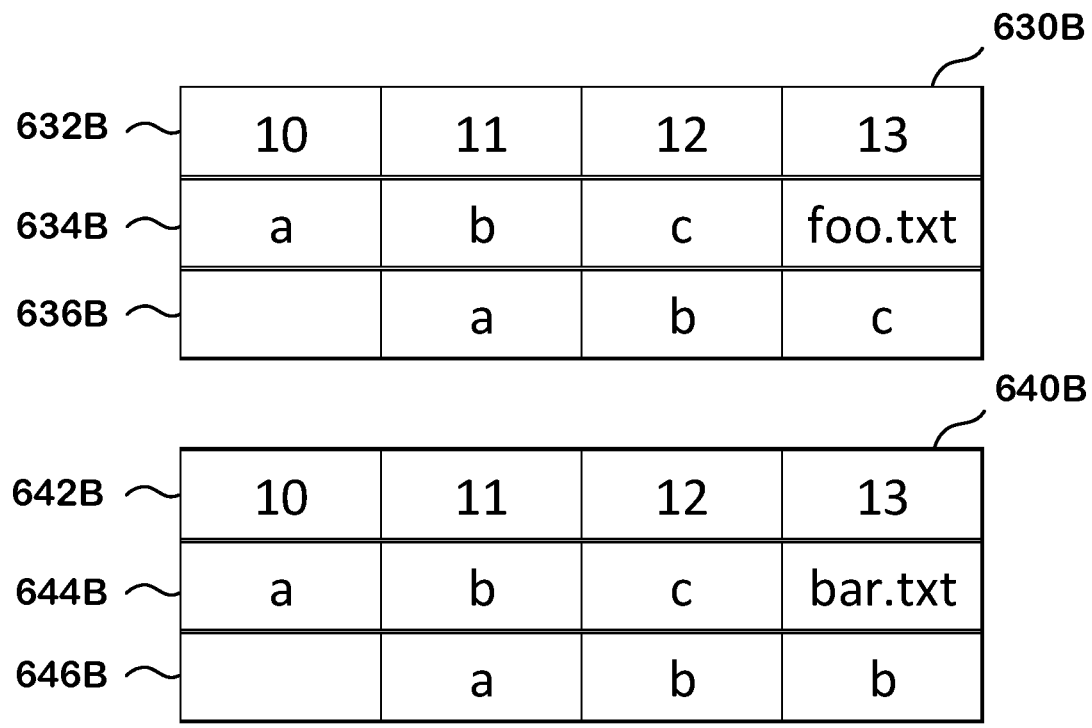
FIG. 6B is an example of identifying a file that has been renamed and moved to a different directory.

FIG. 6A illustrates workflow 600A for detecting when a file/directory is both moved and renamed in a filesystem volume and generating actions for the change according to some embodiments. Although workflow 600A is described in conjunction with system 100 (FIG. 1), other systems may be used to perform the described methods. Workflow 600A is described with reference to FIG. 6B. First keymap 630B and second keymap 640B depict portions of keymaps for illustrative purposes. Back pointers 636B and 646B are shown in first keymaps 630B and 640B (respectively), and snapshot processor 140 may determine paths using the back pointers. The paths may be used to generate first rename action 652B and second rename action 654B below.

At 650A, workflow 600A may enter a loop for each key in a first keymap and a second keymap. Within the loop, at 652A, snapshot processor 140 checks whether a key is both the first keymap (e.g., 630B) and the second keymap (e.g., 640B). Keys (632B and 642B) 10, 11, 12, and 13 are in both keymaps.

If so, at 654A snapshot processor 140 checks whether the directory path and filename are different—between the first keymap and the second keymap. For key 13, (from the first keymap 630B to the second keymap 640B) the name changed from "foo.txt" (634B) to "bar.txt" (644B). Also, for key 13, the directory indicated by back pointer 636B is directory "c" whereas the directory indicated by back pointer 646B is directory "b." Thus, the directory changed. If so, workflow 400C may proceed to 656A.

At 656A, snapshot processor 140 generates a first rename action with a negative level value. For example, first rename action 652B with level value −4 (when performed by backup system 160) moves the file foo.txt to a temporary or scratch directory ".vdfs/." The temporary directory is used a temporary place holder for files.

At 658A, a second rename action may be generated with a positive level value. For example, second rename action 654B having a positive level value of "3" (when performed by backup system 160) moves the file from the temporary directory ".vdfs/" to the destination directory "a/b," renaming the file bar.txt. For instances where the destination directory is a new directory (e.g., a key corresponding the destination directory is not in the first keymap), the new directory can be created as described in FIG. 7A. For instances where the source directory is deleted (e.g., a key corresponding the source directory is not in the second keymap), the source directory can be deleted as described in FIG. 7B.

Following 658A, or when the conditions evaluated at steps 652A or 654A are not met, the current loop iteration can terminate (660A) and workflow 600A can return to the start of loop 650A to process further keys. Once all the keys in the first keymap 630B and in the second keymap 640B have been processed, workflow 600A may end.

VI. Creating and Deleting Files

Figure 7A:
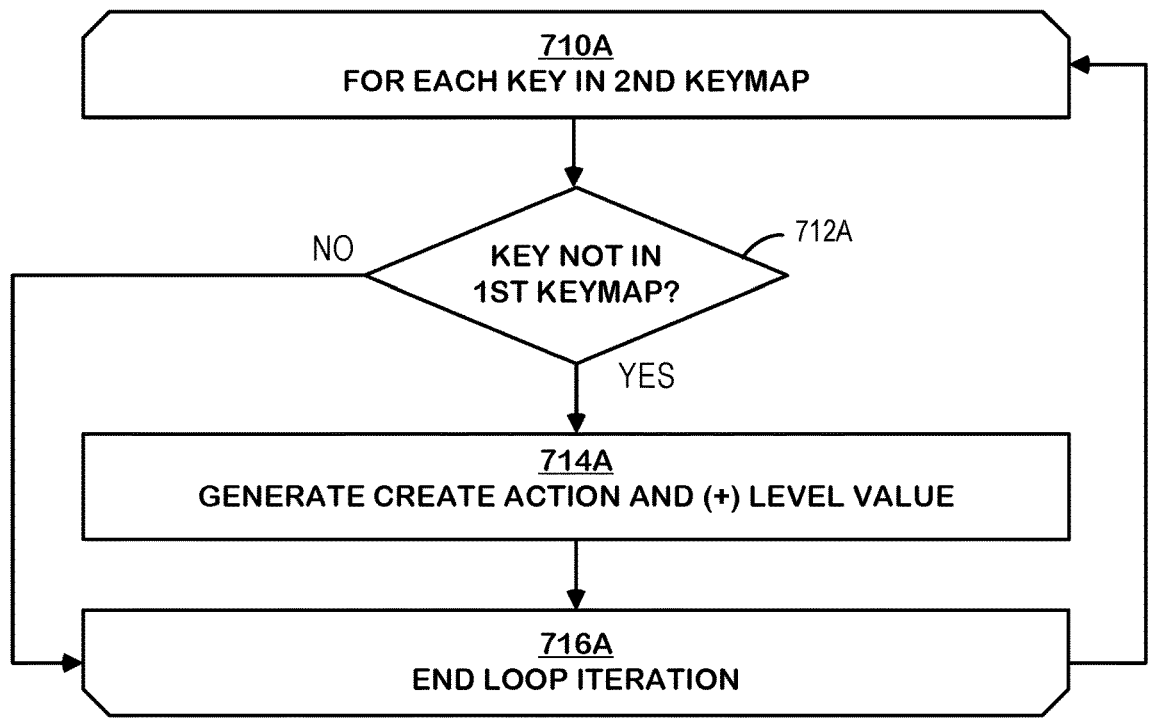
FIGS. 7A-7C are flow diagrams illustrating additional methods for determining differences between keymaps, and generating actions and level values, according to certain embodiments.

FIG. 7A illustrates workflow 700A for detecting when a new file or directory is created in a filesystem volume and generating actions for the change according to various embodiments. Workflow 700A is described with reference to FIGS. 8A and 8B, where file "xyzzy.txt" is created in directory "a/b/" (825).

At 710A, workflow 700A may enter a loop for each key in a second keymap. Within the loop, at 712A, snapshot processor 140 checks whether a key is the second keymap and not in the first keymap. If so, at 714A, snapshot processor 140 generates a create action 855 with a positive level value of "3". Create actions are positive because delete operations should precede create operations. Thus, an object of the same name can be deleted and created properly by deleting the object first and then creating the object. For example, in FIG. 8B, create action 855 creates a new file or directory (when performed by backup system 160). The create action 855 may include making a copy of the data corresponding to the new file or directory at backup system 160.

Following 714A, or when the conditions evaluated at 712A are not met, the current loop iteration can terminate (716A) and workflow 700A can return to the start of loop 710A to process further keys. Once all the keys in the second keymap have been processed, workflow 700A may end.

Figure 7B:
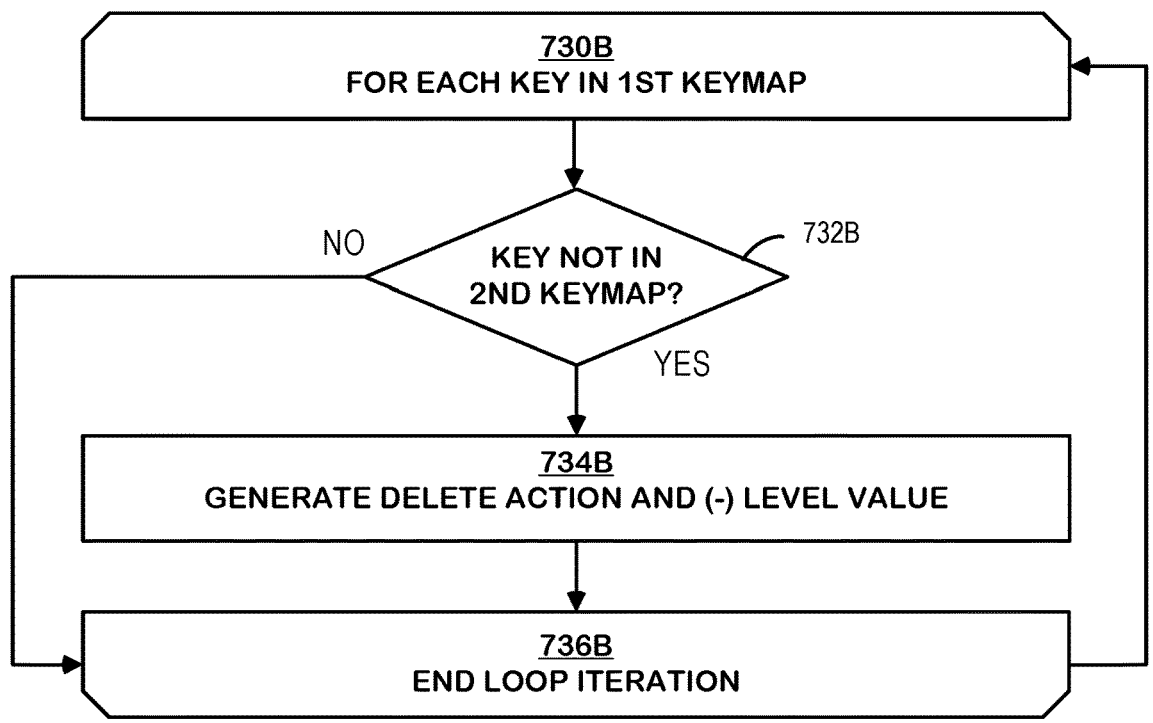

FIG. 7B illustrates workflow 700B for detecting when a file/directory is removed in a filesystem volume and generating actions for the change according to some embodiments. Workflow 700B is described with reference to FIGS. 8A and 8B, where directory "c" is deleted (824). At 730B, workflow 700B may enter a loop for each key in a first keymap. Within the loop, at 732B, snapshot processor 140 checks whether a key is the first keymap and not in the second keymap. If so, a delete action may be generated with a negative level value (734B). Snapshot processor 140 uses a negative value because the action is a delete operation, which as described above causes the delete operation to be performed before create operations. In FIG. 8B, a delete action 851 with a −3 level value deletes directory "c."

Following 734B, or when the conditions evaluated at 732B are not met, the current loop iteration can terminate (736B) and workflow 70B can return to the start of loop 730B to process further keys. Once all the keys in the first keymap have been processed, workflow 700B may end.

VII. Modifying Files

Figure 7C:
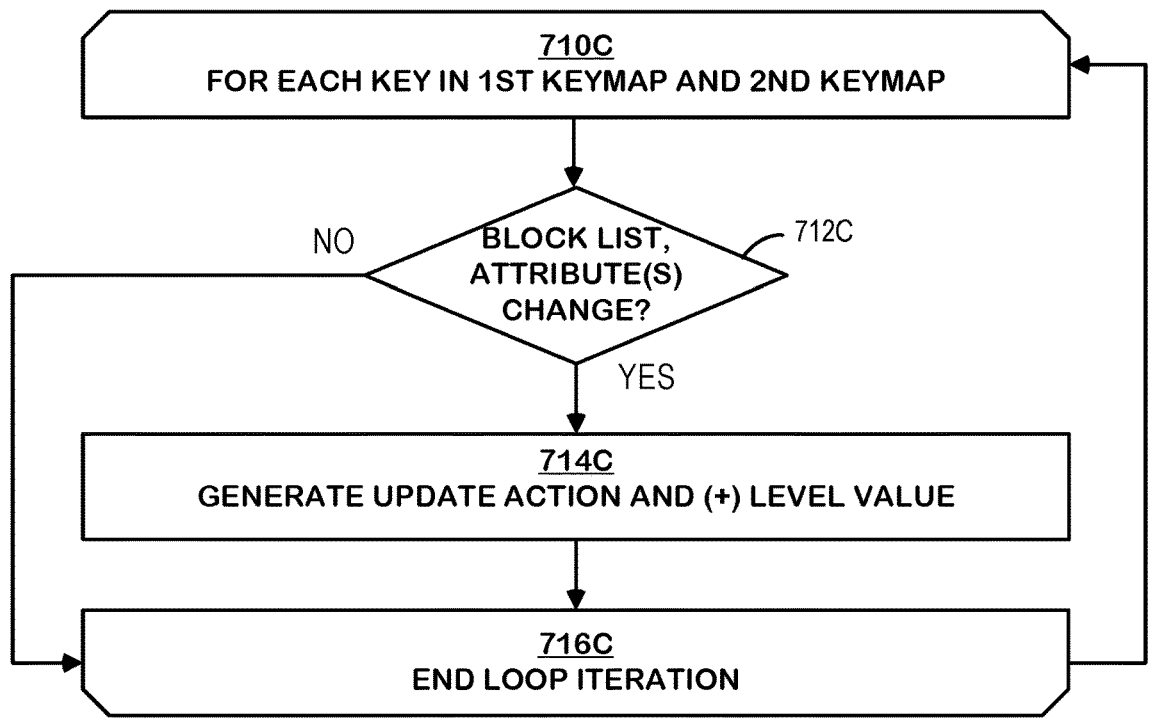

FIG. 7C illustrates workflow 700C for detecting when a file is modified in a filesystem volume and generates an update action for the change according to some embodiments. At 710C, workflow 700C may enter a loop for each key in a first keymap (e.g., 830) and a second keymap (e.g., 840). Within the loop, at 712C, snapshot processor 140 may determine whether a file has been modified (but not moved). Snapshot processor 140 may determine a file has been modified by comparing the file's list of blocks in the first snapshot to the list of the file's list of blocks in the second snapshot. Usually, a file's block list will change—such as one or more blocks being added, deleted or changed—when the file is modified. Additionally or alternatively, a file is modified when file attributes—such as permission data (e.g., read, write, and execute)—are changed. If so, at 714C, snapshot processor 140 generates an update action with a positive level value. Turning to the example of FIGS. 8A and 8B, update action 856 with a 3 level value (when performed by backup system 160) updates file "qux.txt."

Following 714C, or when the conditions evaluated at 712C are not met, the current loop iteration can terminate (716C) and workflow 700C can return to the start of loop 710C to process further keys. Once all the keys in the first keymap have been processed, workflow 700C may end.

VIII. Example Delete, Move, Rename, Create, and Update

FIGS. 8A and 8B illustrate detecting multiple operations and exporting the changes as actions, in accordance with some embodiments. In this example, files "foo.txt" (812) and "bar.txt" (814) are in directory "a/b/c". File "qux.txt" (816) is in directory "a/b." Between a first snapshot 132 and a second snapshot 134, the following operations are performed on a filesystem volume as shown at 820. For example, storage system 130 receives the following changes from a user. At 821, a delete operation deletes "bar.txt." At 822, a move operation moves "foo.txt" to directory "a/b." At 823, a rename operation renames "foo.txt" to "baz.txt." At 824, a delete operation 824 removes directory "a/b/c." At 825, a new file operation 825 adds new file "xyzzy.txt" to directory "a/b." At 826, file "qux.txt" is modified. Snapshot processor 140 generates actions 850 in FIG. 8B that reproduce operations 821-826 by determining the differences between first keymap 830 and second keymap 840. First keymap 830 and second keymap 840 each show a portion of a keymap for illustrative purposes.

First keymap 830 includes key numbers 832 and names 834. Second keymap 840 includes key numbers 842 and names 844. Comparing key numbers 832 and key numbers 842, key numbers 10 and 11 do not indicate a change and snapshot processor 140 generates no actions. However, key number 12 is present in first keymap 830 and not in second keymap 840, so snapshot processor 140 generates a delete directory action at 851 in FIG. 8B. The delete directory action includes a level value of "−3" because the action is a delete operation and the directory level is a depth of three levels.

Continuing to compare key numbers in sequential order, key number 13 has changed names (834 and 844), and snapshot processor 140 generates a first rename action at 852 and a second rename action at 853. Directory ".vdfs" is a temporary or scratch directory. File "13" (where 13 may be the filesystem object's key number) is a temporary or scratch file. The first rename action at 852 includes a negative level value of "−4" because the action is a first rename operation and the directory level is at a depth of four levels. The second rename action at 853 includes a positive level value of "3" because the action is a second rename operation and the directory level is at a depth of three levels. That is, the destination for the file "baz.txt" is the directory "a/b" (determined from back pointers 846) compared to the original directory of "a/b/c" (determined from back pointers 836).

Key number 14 is present in first keymap 830 and not in second keymap 840, so snapshot processor 140 generates a delete file action 854. The delete file action includes a level value of "−5" because the action is a delete operation and the directory level is at a depth of five levels. Key number 15 is present in both keymaps 830 and 840, but has a different list of blocks and/or a changed file object attribute (not depicted in FIG. 8A). Accordingly, snapshot processor 140 generates a modify file action 856. The modify file action includes a level value of "3" because the action is a modify operation and the directory level is at a depth of three levels. Key number 16 is present in second keymap 840 and not in first keymap 830, so snapshot processor 140 generates a create file action 855. The create action includes a positive level value of "3" because the action is a create operation and the directory level is at a depth of three levels. Actions 850 depict actions 851-856 in the order they were generated (e.g., not sorted). Snapshot processor 140 then sorts actions 851-856 in ascending (from smallest to largest) order to generate actions 860.

When backup system 160 receives actions 850, backup system performs the actions in the sorted order. Backup system 160 deletes the file "bar.txt" first. Then, backup system 160 performs the rename operation to move file "foo.txt" to a temporary location. Since backup system 160 has moved the file "foo.txt" from directory c, backup system 160 can delete directory "c." Then, backup system 160 moves file "foo.txt" to directory "a/b" and renames the file to "baz.txt". Upon moving and renaming the file "foo.txt", backup system 160 can create a file "xyzzy.txt" and modify file "qux.txt" in directory "a/b." Accordingly, instead of having to delete file "foo.txt", backup system 160 moves the file to a temporary directory while backup system 160 deletes a directory. Backup system 160 moves the file to the target directory upon creation. This saves transferring the file from storage system 130 to backup system 160. Although a file is discussed, if the file is a directory that is renamed, then a large number of files in the directory may be deleted and recreated. Snapshot processor 140 avoids having the files in the directory deleted and recreated using the rename operations.

IX. Conclusion

Embodiments of the present technology use point-in-time copies of filesystem trees to record the filesystem state. These copies are referred to as snapshots. Techniques disclosed herein enable snapshot processor 140 to accurately identify differences (and hence data changes) between an initial snapshot and a subsequent snapshot. Snapshot processor 140 can further generate an ordered sequence of actions that, for example, perform efficient filesystem moves and renames, among others in a proper order to reproduce the changes.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
receiving, by a snapshot processor of a storage system, a first snapshot of a filesystem volume in the storage system, first filesystem information pertaining to a first state of a filesystem associated with the filesystem volume at a time the first snapshot was taken, a second snapshot of the filesystem volume, and second filesystem information pertaining to a second state of the filesystem at a time the second snapshot was taken, wherein the second snapshot is created at a later point in time than the first snapshot, and wherein a backup system stores a first backup copy of the file system volume corresponding to the first snapshot, and wherein the backup system is separate from the storage system;
generating, by the snapshot processor, a backup action list based on the first snapshot, the first filesystem information, the second snapshot, and the second filesystem information, wherein the backup action list includes an ordered sequence of filesystem operations that may be applied by the backup system to the first backup copy in order to produce a second backup copy of the filesystem volume corresponding to the second snapshot, and wherein generating the backup action list comprises:
producing a first keymap using the first snapshot and the first filesystem information, the first keymap including a key and associated information regarding each filesystem object of the filesystem volume in the first snapshot;
producing a second keymap using the second snapshot and the second filesystem information, the second keymap including a key and associated information regarding each filesystem object of the filesystem volume in the second snapshot;
analyzing differences between the first keymap and the second keymap to determine the ordered sequence of filesystem operations; and
providing, by the snapshot processor, the backup action list to the backup system for application to the first backup copy.

2. The method of claim 1, wherein generating the backup action list further comprises:
generating level values for a plurality of filesystem operations based on the first and second keymaps using a number of elements in a path associated with each filesystem operation in the plurality of filesystem operations; and ordering the plurality of filesystem operations using the generated level values to produce the ordered sequence of filesystem operations.

3. The method of claim 2 wherein the plurality of file system operations includes:

a first filesystem operation that is assigned a negative level value, and a second filesystem operation that is assigned a positive level value.

4. The method of claim 1, wherein generating the backup action list further comprises:

generating a create filesystem operation and an associated positive level value, when a key is in the second keymap and not in the first keymap.

5. The method of claim 1, wherein generating the backup action list further comprises:

generating a delete filesystem operation and an associated negative level value, when a key is in the first keymap and not in the second keymap.

6. The method of claim 1, wherein generating the backup action list further comprises:

generating an update filesystem operation and an associated positive level value when at least one of a file attribute and a list of blocks associated with a file in the first snapshot is different in the second snapshot.

7. A non-transitory computer-readable storage medium containing instructions, that when executed, control a computer system to be operable for:

receiving, by a snapshot processor of a computer system, a first snapshot of a filesystem volume in the storage system, first filesystem information pertaining to a first state of a filesystem associated with the filesystem volume at a time the first snapshot was taken, a second snapshot of the filesystem volume, and second filesystem information pertaining to a second state of the filesystem at a time the second snapshot was taken, wherein the second snapshot is created at a later point in time than the first snapshot, and wherein a backup system stores a first backup copy of the file system volume corresponding to the first snapshot, and wherein the backup system is separate from the storage system;

generating, by the snapshot processor, a backup action list based on the first snapshot, the first filesystem information, the second snapshot, and the second filesystem information, wherein the backup action list includes an ordered sequence of filesystem operations that may be applied by the backup system to the first backup copy in order to produce a second backup copy of the filesystem volume corresponding to the second snapshot, and wherein generating the backup action list comprises:

producing a first keymap using the first snapshot and the first filesystem information, the first keymap including a key and associated information regarding each filesystem object of the filesystem volume in the first snapshot;

producing a second keymap using the second snapshot and the second filesystem information, the second keymap including a key and associated information regarding each filesystem object of the filesystem volume in the second snapshot;

analyzing differences between the first keymap and the second keymap to determine the ordered sequence of filesystem operations; and providing, by the snapshot processor, the backup action list to the backup system for application to the first backup copy.

8. The non-transitory computer-readable storage medium of claim 7, wherein generating the backup action list further comprises:

generating level values for a plurality of filesystem operations based on the first and second keymaps using a number of elements in a path associated with each filesystem operation in the plurality of filesystem operations; and ordering the plurality of filesystem operations using the generated level values to produce the ordered sequence of filesystem operations.

9. The non-transitory computer-readable storage medium of claim 8 wherein the plurality of file system operations includes:

a first filesystem operation that is assigned a negative level value, and a second filesystem operations that is assigned a positive level value.

10. The non-transitory computer-readable storage medium of claim 7, further operable for wherein generating the backup action list further comprises:

generating a create filesystem operation and an associated positive level value, when a key is in the second keymap and not in the first keymap.

11. The non-transitory computer-readable storage medium of claim 7, wherein generating the backup action list further comprises:

generating a delete filesystem operation and an associated negative level value, when a key number is in the first keymap and not in the second keymap.

12. The non-transitory computer-readable storage medium of claim 7, wherein generating the backup action list further comprises:

generating an update filesystem operation and an associated positive level value when at least one of a file attribute and a list of blocks associated with a file in the first snapshot is different in the second snapshot.

13. An apparatus comprising:

one or more computer processors; and non-transitory computer-readable storage medium comprising instructions, that when executed, control a snapshot processor of the apparatus to be operable for:

receiving a first snapshot of a filesystem volume in the storage system in the apparatus, first filesystem information pertaining to a first state of a filesystem associated with the filesystem volume at a time the first snapshot was taken, a second snapshot of the filesystem volume, and second filesystem information pertaining to a second state of the filesystem at a time the second snapshot was taken, wherein the second snapshot is created at a later point in time than the first snapshot, and wherein a backup system stores a first backup copy of the file system volume corresponding to the first snapshot, and wherein the backup system is separate from the storage system;

generating a backup action list based on the first snapshot, the first filesystem information, the second snapshot, and the second filesystem information, wherein the backup action list includes an ordered sequence of filesystem operations that may be applied by the backup system to the first backup copy in order to produce a second backup copy of the filesystem volume corresponding to the second snapshot, and wherein generating the backup action list comprises:
- producing a first keymap using the first snapshot and the first filesystem information, the first keymap including a key and associated information regarding each filesystem object of the filesystem volume in the first snapshot;
- producing a second keymap using the second snapshot and the second filesystem information, the second keymap including a key and associated information regarding each filesystem object of the filesystem volume in the second snapshot;
- analyzing differences between the first keymap and the second keymap to determine the ordered sequence of filesystem operations; and providing the backup action list to the backup system for application to the first backup copy.

14. The apparatus of claim 13, further operable for wherein generating the backup action list further comprises:
- generating level values for a plurality of filesystem operations based on the first and second keymaps using a number of elements in a path associated with each filesystem operation in the plurality of filesystem operations; and
- ordering the list of actions plurality of filesystem operations using the generated level values to produce the ordered sequence of filesystem operations.

15. The apparatus of claim 14, wherein the plurality of file system operations includes:
- a first filesystem operation that is assigned a negative level value, and
- second filesystem operation that is assigned a positive level value.

16. The apparatus of claim 13, wherein generating the backup action list further comprises:
- generating a create filesystem operation and an associated positive level value, when a key is in the second keymap and not in the first keymap.

17. The apparatus of claim 13, wherein generating the backup action list further comprises:
- generating a delete filesystem operation and an associated negative level value, when a key is in the first keymap and not in the second keymap.

18. The apparatus of claim 13, wherein generating the backup action list further comprises:
- generating an update filesystem operation and an associated positive level value when at least one of a file attribute and a list of blocks associated with a file in the first snapshot is different in the second snapshot.

* * * * *